(12) United States Patent
Dumon et al.

(10) Patent No.: US 8,370,336 B2
(45) Date of Patent: Feb. 5, 2013

(54) METHODS AND SYSTEMS FOR DERIVING DEMAND METRICS USED IN ORDERING ITEM LISTINGS PRESENTED IN A SEARCH RESULTS PAGE

(75) Inventors: Olivier G. Dumon, San Francisco, CA (US); Ryan McDonald, San Francisco, CA (US); Muhammad Faisal Rehman, San Jose, CA (US); Julie Netzloff, San Jose, CA (US); Ken Sun, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 292 days.

(21) Appl. No.: 12/476,134

(22) Filed: Jun. 1, 2009

(65) Prior Publication Data

US 2010/0262596 A1 Oct. 14, 2010

Related U.S. Application Data

(60) Provisional application No. 61/167,796, filed on Apr. 8, 2009.

(51) Int. Cl.
*G06F 7/00* (2006.01)
(52) U.S. Cl. .......................... 707/723; 707/725
(58) Field of Classification Search ............ 707/723, 707/725
See application file for complete search history.

(56) References Cited

U.S. PATENT DOCUMENTS

| | | | |
|---|---|---|---|
| 2003/0135490 A1* | 7/2003 | Barrett et al. ........... | 707/3 |
| 2007/0033531 A1 | 2/2007 | Marsh | |
| 2007/0150470 A1 | 6/2007 | Brave et al. | |
| 2007/0192314 A1 | 8/2007 | Heggem | |
| 2007/0288433 A1* | 12/2007 | Gupta et al. ........... | 707/3 |
| 2008/0275864 A1 | 11/2008 | Kim et al. | |

FOREIGN PATENT DOCUMENTS

WO WO-2010118167 A1 10/2010

OTHER PUBLICATIONS

"International Application Serial No. PCT/US2010/030287, International Preliminary Report on Patentability mailed Oct. 20, 2011", 6 pgs.
"International Application Serial No. PCT/US10/30287, Search Report mailed Jun. 9, 2010", 11.
"International Application Serial No. PCT/US10/30287, Written Opinion mailed Jun. 9, 2010", 4.

* cited by examiner

*Primary Examiner* — Vincent Boccio
(74) *Attorney, Agent, or Firm* — Schwegman, Lundberg & Woessner, P.A.

(57) ABSTRACT

Methods and systems for using a half-life formula for deriving demand metrics used in ordering item listings, when presenting those item listings in a search results page, are described. In some embodiments, a demand metric for an item listing is derived by monitoring events associated with item listings, such as, keeping a count of the number of search impressions an item listing receives. A half-life formula is used to ensure that events occurring earlier in time contribute less to the demand metric than more recently occurring events. The demand metric are used to order the item listings, when the item listings are being presented in a search results page.

14 Claims, 5 Drawing Sheets

METHODS AND SYSTEMS FOR DERIVING DEMAND METRICS USED IN ORDERING ITEM LISTINGS PRESENTED IN A SEARCH RESULTS PAGE

RELATED APPLICATIONS

This patent application claims the benefit of the filing date of the provisional patent application with Application Ser. No. 61/167,796, filed on Apr. 8, 2009, and entitled, "METHODS AND SYSTEMS FOR PRESENTING ITEM LISTINGS IN A SEARCH RESULTS PAGE", which is hereby incorporated herein by reference.

TECHNICAL FIELD

The present disclosure generally relates to data processing techniques. More specifically, the present disclosure relates to methods and systems for managing how search results are processed and presented to a user of a computer-based trading or ecommerce application.

BACKGROUND

In the retail industry, it has long been known that product placement can greatly impact sales. For instance, in a grocery store, a product (e.g., a box of cereal) placed on a shelf at approximately eye level will tend to outsell a similar product placed on the bottom shelf. This general principle holds true in the context of ecommerce as well. When presenting item listings in a search results page, the position of an item listing within the page—particularly, the position relative to other item listings—can seriously impact the transactions (e.g., sales) resulting from the presentation of item listings that satisfy a search query. Consequently, presenting the item listings that are most likely to result in the conclusion of a transaction in the most prominent positions on the search results page can increase the number of transactions. Unfortunately, it is difficult to identify the item listings that are most likely to result in sales.

One way to assess the likelihood that an item listing will, if presented in a search results page, result in the conclusion of a transaction is to monitor certain user-initiated activities or events associated with the item listing, or, with item listings determined to be similar. For instance, if a particular item listing is presented in a list of item listings that satisfy a user's search query, and a user views the item listing, (e.g., by clicking on the item listing with a cursor control device, or otherwise selecting it), this event (referred to simply as a "view") may be used as a measure for demand for the item offered via the item listing. Accordingly, the total number of views an item listing receives can be used as a demand metric, which in turn, can be used to predict the likelihood that an item listing will result in a transaction, if presented in the search results page. Similarly, the number of search impressions, bids (for auction item listings), watch lists, actual sales, and other events can be used as demand metrics as well. Using this general approach, with all else equal, given two item listings where the first item listing has been viewed ten times, and the other item listing viewed only once, the item listing viewed ten times would have a higher demand metric, and thus would be positioned first (e.g., at the top) of a search results page.

One problem with this approach is that the timing of the events used to derive the demand metric for the item listings is not taken into consideration. For example, referring to FIG. 1, three event timelines are shown. The event timeline with reference number 2-A shows the timing of the events 8-A (represented as vertical lines) used in deriving the demand metric for Item Listing A. Similarly, the event timelines with reference numbers 2-B and 2-C show the timing of events used in deriving the demand metrics for Item Listings B and C, respectively. For this example, the events could represent any combination of search impressions, views, bids, sales, watch lists, or other similar user-initiated actions. The graph 4 shows the value of the demand metrics for the three item listings over a period of time (e.g., 50 days). For purposes of this example, if we assume that time is measured in days, the line 6-A in the graph 4 representing the demand metric for item listing A rises relatively quickly from zero to ten with a steep slope over the first (approximately) ten days. Because the events 8-B for item listing B occurred more evenly spaced throughout days zero to fifty, the line representing the demand metric for item listing B rises from zero to ten with a more gradual slope over fifty days. Finally, for item listing C, because all ten events 8-C occur within the last (approximately) ten days, the line 6-C representing the demand metric for item listing C rises from zero to ten over the course of the final ten days.

Figure 1:
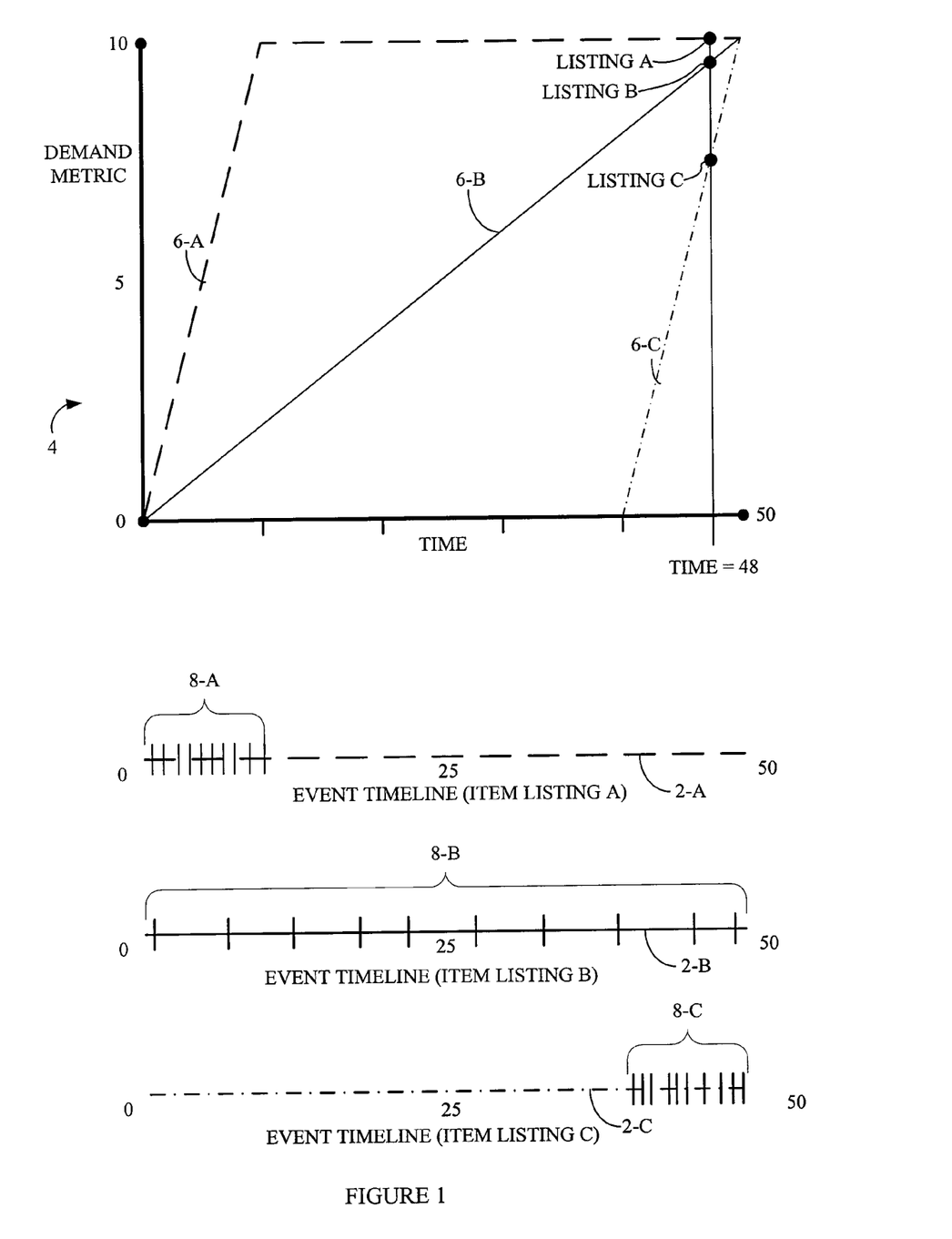
FIG. 1 is a chart illustrating the values of three demand metrics over time, for each of three different item listings with varying event timelines.

The scenarios for which the example may be applicable are endless. However, in one scenario, Item Listing A may be for a first version of a product, whereas Item Listing C is a newly released, improved version of the same product. In such a scenario, the new and improved product associated with Item Listing C would naturally be expected to outsell the product it is replacing, associated with Item Listing A. As shown in the graph, at TIME=48 (representing day forty-eight), the demand metrics for Item Listings A, B and C are (approximately) ten, nine and seven, respectively. Despite the concentrated number of events 8-C associated with item listing C that occurred in the several days leading up to day forty-eight, and the fact that no event has occurred in the previous (approximately) thirty-eight days for Item Listing A, the demand metric for Item Listing A is greater than that of Item Listings B and C. Consequently, a better method and system for assessing demand metrics used in determining the likelihood that an item listing will result in a sale is desired.

DESCRIPTION OF THE DRAWINGS

Some embodiments are illustrated by way of example and not limitation in the figures of the accompanying drawings, in which.

DETAILED DESCRIPTION

Methods and systems for deriving demand metrics for use in assessing the likelihood that an item listing, if presented in a search results page, will result in a transaction are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

In some embodiments, when a user submits a search query to an on-line trading application, the item listings that satisfy the search query are assigned a ranking score, and ordered based on the ranking score, when presented in a search results page. Depending on the particular implementation, many inputs (e.g., factors and/or component scores) may be used to derive the overall ranking score. In some embodiments, the ranking score assigned to each item listing that satisfies the search query may be based solely, or in part, on one or more observed demand metrics derived for each item listing based on an analysis of certain events that occur in connection with the item listings. For instance, a demand metric may be based on events including the number of search impressions an item listing has received, the number of views, the number of bids, the number of transactions, the number of times a user has added an item listing to a watch list, or some similar user-initiated interaction with an item listing. A search impression is simply a presentation of an item listing in a search results page. For instance, each time an item listing is presented in a search results page, a search impression count for the item listing is increased. A view results when a user selects an item listing presented in a search results page, and a detailed view of the item listing is presented. In some embodiments, a user may be able to monitor activities associated with an item listing, for example, by adding an item listing to a watch list. Accordingly, the number of times an item listing has been added to a watch list might be used as a demand metric.

Consistent with an embodiment of the invention, the value given to an event in calculating a demand metric is determined based on when the event occurred relative to the day and/or time the search request is being processed and the ranking score is being assigned to the item listing. For instance, those events occurring most recent in time are given greater weight than those occurring in the recent past. In particular and as described in greater detail below, in some embodiments, a half life formula is used to "discount" or "decay" the weight of events occurring in the past, when those events are used to derive a demand metric.

Figure 2:
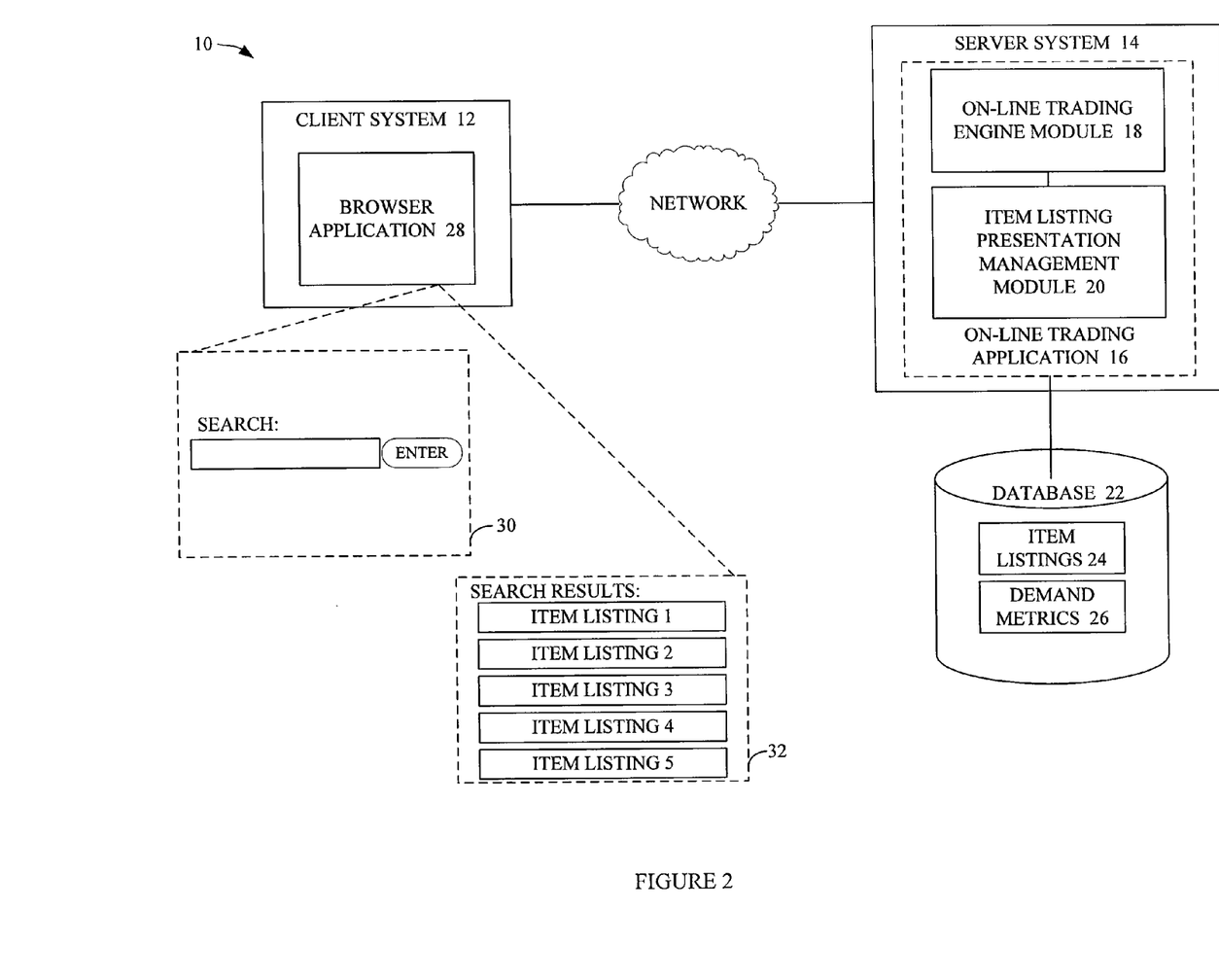
FIG. 2 is a block diagram of a network environment including a network-connected client system and server system, with which an embodiment of the invention might be implemented.

FIG. 2 is a block diagram of a network environment 10 including a network-connected client system 12 and server system 14, with which an embodiment of the invention might be implemented. As illustrated in FIG. 2, the server system 14 is shown to include an on-line trading application 16. In this example, the online trading application 16 is comprised of two primary modules—an on-line trading engine module 18, and an item listing presentation management module 20.

In some embodiments, the on-line trading engine module 18 may consist of a variety of sub-components or modules, which provide some of the functions of an on-line trading application 16. As described more completely below, each module may be comprised of software instructions, computer hardware components, or a combination of both. To avoid obscuring the invention in unnecessary detail, only a few of the on-line trading engine functions (germane to the invention) are described herein. For example, the on-line trading engine module 18 may include an item listing management module (not shown) that facilitates the receiving and storing of data representing item attributes, which collectively form an item listing. When a user desires to list a single item, or multiple items, for sale, the user will provide information about the item(s) (e.g., item attributes). Such information may be submitted via one or more forms of one or more web pages, or via a drop down lists, or similar user interface elements. The item listing management module receives the item attributes and stores the item attributes together within a database 22 as an item listing 24. In some instances, the item listings may be stored in an item listing database table. As described in greater detail below, the item attributes of each item listing are analyzed to determine a ranking score assigned to item listings and used in determining the position of item listings when the item listings are being presented in a search results page.

Referring again to FIG. 2, the second primary module of the on-line trading application 16 is an item listing presentation management module 20. The item listing presentation management module 20 provides the logic necessary to assign a ranking score (sometimes referred to as a Best Match Score) to item listings that satisfy a search query, and to use the ranking score to determine the order of item listings when the item listings are presented in a search results page.

For instance, in some embodiments, a user operates a web browser application 28 on a client system 12 to interact with the on-line trading application residing and executing on the server system 14. As illustrated by the example user interface with reference number 30, a user may be presented with a search interface, with which the user can specify one or more search terms to be used in a search request submitted to the on-line trading application 16. In some embodiments, in addition to specifying search terms, users may be able to select certain item attributes, such as the desired color of an item, the item categories that are to be searched, and so on. After receiving and processing the search request, the on-line trading application 16 communicates a response to the web browser application 28 on the client system 12. For instance, the response is an Internet document or web page that, when rendered by the browser application 28, displays a search results page showing several item listings that satisfy the user's search request. As illustrated in the example search results page 32 of FIG. 2, the item listings are arranged or positioned on the search results page in an order determined by the item listing presentation management module 20. The item listings are, in some embodiments, presented by a presentation module (not shown), which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in some manner other than a top-down list.

The ranking score used to order the item listings may be based on several component scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and, a business rules score, representing a promotion or demotion factor determined based on the evaluation of one or more business rules. As used herein, a component score is a score that is used in deriving the overall ranking score for an item listing. However, a component score in one embodiment may be a ranking score in another embodiment. For instance, in some embodiments, the ranking score may be based on a single component score, such as the listing quality score. One or more of the components scores may be based on, or equivalent to an demand metric calculated as described below.

In some embodiments, a demand metric is essentially a score calculated as a count of the number of events (e.g., search impressions, views, bids, watch lists, and so on) that occur for a particular item listing, where events that occurred in the past are discounted as described below. In some embodiments, the score may be based on a combination of different events (e.g., bids and search impressions), or alternatively, the score may be based on a count of events of a single type, such as the number of search impressions. However, because events that have occurred more recently (i.e., closer in time to the search request) are a more meaningful predictor of demand, events that occurred in the past are given less weight in deriving the demand metric. In some embodiments, the score for a demand metric is calculated using a half life formula, such as:

$$\text{SCORE}(t_\downarrow n) = 2^{\uparrow}((-[(t/_\downarrow n - t_\downarrow (n-1))/\lambda) * \text{SCORE}(t_\downarrow (n-1)) + \text{Incremental Score}$$

Accordingly, for those events counting toward the score, but occurring in a prior time period, the value of such events is reduced exponentially over time, consistent with the equation above.

In this equation, the Incremental Score represents the events that have occurred in the current time period for which the demand metric is being calculated. For example, if the demand metric is calculated every ten days (a time period), the Incremental Score would simply be a count of the relevant events that occurred in the past ten days. For all events occurring in a prior time period, the value of those events that count toward the score decays exponentially over time. The exponential expression $[(t]_n - t_{n-1})$ represents the time since the last update of the "decayed" count occurred. In some embodiments, the granularity of this time delta is close to the fastest expected frequency with which demand metrics will be updated. The parameter lambda in the equation above represents the time in days until the contribution of an event (e.g., a search impression, bid, view, etc.) to the score is reduced by half. In some embodiments, the value of lambda will be configurable, for example, by item categories or sites.

Figure 3:
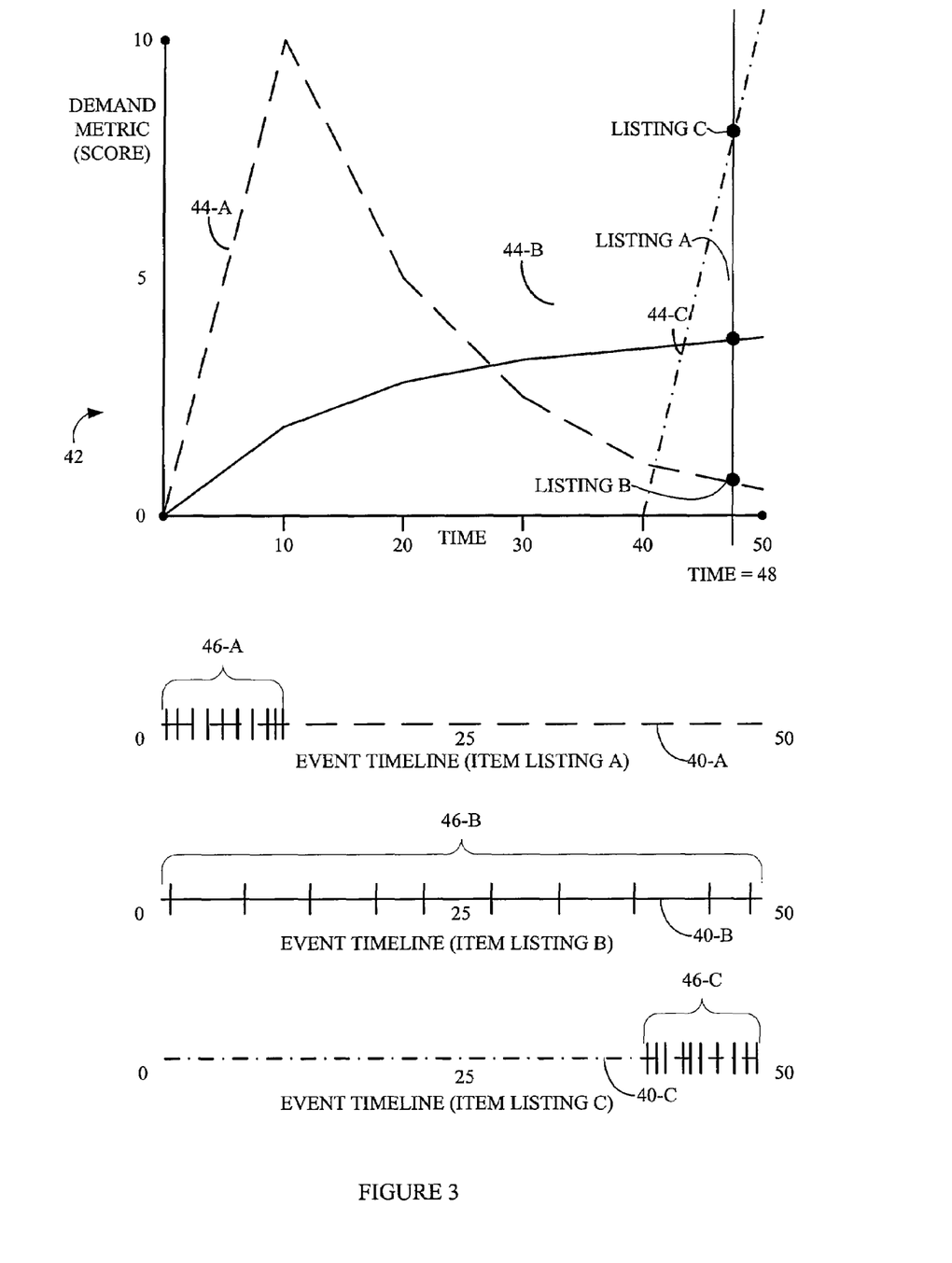
FIG. 3 is a chart illustrating the values of three demand metrics over time, for each of three different item listings with varying event timelines, where the demand metrics have been calculated with methods consistent with an embodiment of the invention.

FIG. 3 illustrates a graph 42 showing an example of the value of demand metrics over time for three different item listings, according to an embodiment of the invention. In FIG. 3, three event timelines 40-A, 40-B and 40 C are shown for three different item listings. These event timelines are the same as those illustrated in FIG. 1. The event timeline with reference number 40-A shows the timing of the events 46-A (represented as vertical lines) used in deriving the demand metric for Item Listing A. Similarly, the event timelines with reference numbers 40-B and 40-C show the timing of events used in deriving the demand metrics for Item Listings B and C, respectively. Again, the events represent the occurrence of certain user-initiated activities, such as search impressions, views, bids, sales, watch lists, or other similar user-initiated actions. The graph 42 shows the value of the demand metrics for the three item listings over a period of time (e.g., 50 days). For purposes of this example, the demand metrics are calculated every ten days.

As shown in FIG. 3, the line 44-A representing the demand metric score for item listing A rises with a rapid slope from zero to ten over the first ten days. Accordingly, at day ten, the value of the demand metric for item listing A is ten. However, over the next ten days (days ten to twenty), no events are recorded for item listing A. Accordingly, the demand metric score for item listing A at day twenty decreases to five. In this example, the value of lambda is ten, such that the value of the demand metric from one time period (ten days) to the next results in a reduction by half. At day thirty, the demand metric scores are re-computed. Because item listing A has no recorded events for days twenty to thirty, the demand metric score is again reduced by half, to two and one-half. As shown in FIG. 3, the demand metric score for item listing A is again reduced by half such that on day forty-eight the demand metric score for item listing A is just over one.

The demand metric score for item listing B, represented by the line with reference number 44-B, rises from zero to two over the first ten day period. Over days ten to twenty, two additional events occur for item listing B. Accordingly, at day twenty, the demand metric score is equal to three—two for the events occurring in days ten to twenty, and one (half of two) for the two events occurring in days zero to ten. At day fifty, the value of the demand metric score for item listing B is just under four (3.875).

For item listing C, the demand metric score is zero until the final time period. During the final ten days shown in the graph 42, item listing C records ten events. Accordingly, at day fifty, the demand metric score for item listing C is ten.

If a demand metric score was calculated at day 48, the demand metric scores for the three item listings would be: item listing A (0.875), item listing B (3.875), and item listing C (approximately 9). This differs significantly from the result shown in FIG. 1, in which, at day forty-eight, item listing A has the highest demand metric score, followed by item listings B and C, respectively.

Figure 4:
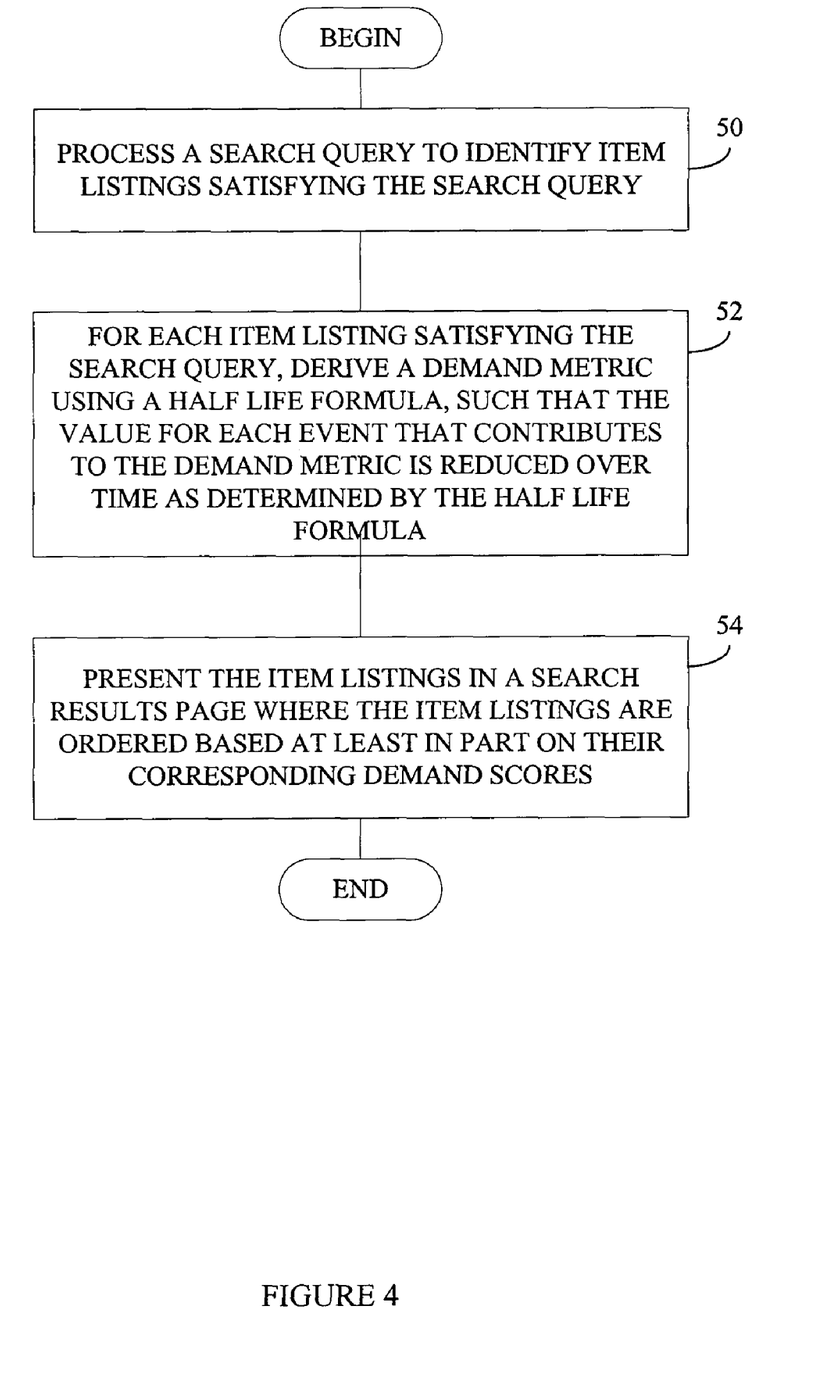
FIG. 4 is a flow diagram illustrating the method operations for deriving a demand metric for use in ordering item listings, according to an embodiment of the invention.

FIG. 4 illustrates a method, according to an embodiment of the invention, for deriving a demand metric with a half life formula for use in ordering item listings presented in a search results page. At method operation 50, a search query is processed to identify item listings satisfying the search query. For instance, a user may submit a search query (with search terms) via a web-based form, or other web page. When the search query is received, a search engine, processes the search query to identify item listings that satisfy the search query.

Next, at method operation 52, for each item listing determined to satisfy the search query, a demand metric is derived for use in ranking or ordering the item listings. The demand metric may be pre-computed, such that, at the time of processing the search query, the demand metric is simply looked-up. For instance, in some embodiments, the demand metrics for each item listing are periodically calculated. The demand metric may be based solely on a count of one type of event, such as search impressions, or any combination of events, to include, search impressions, views, bids, sales, and watch list entries. When deriving the demand metric, the value of those events occurring during a prior time period are discounted (or, decayed) as determined by a half-life formula (or, another similar formula), giving greater weight to the more recently occurring events.

Finally, at method operation 54, the item listings are presented in a search results page, ordered at least in part based on their corresponding demand metrics. For instance, in some embodiments, the demand metrics may be an input for calculating a ranking score. In other embodiments, the demand metric may be the actual ranking score.

The various operations of example methods described herein may be performed, at least partially, by one or more processors that are temporarily configured (e.g., by software) or permanently configured to perform the relevant operations. Whether temporarily or permanently configured, such processors may constitute hardware-implemented, or processor-implemented modules that operate to perform one or more operations or functions. The modules referred to herein may, in some example embodiments, comprise hardware- or processor-implemented modules.

Similarly, the methods described herein may be at least partially hardware- or processor-implemented. For example, at least some of the operations of a method may be performed by one or more hardware components, or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Computer System

Figure 5:
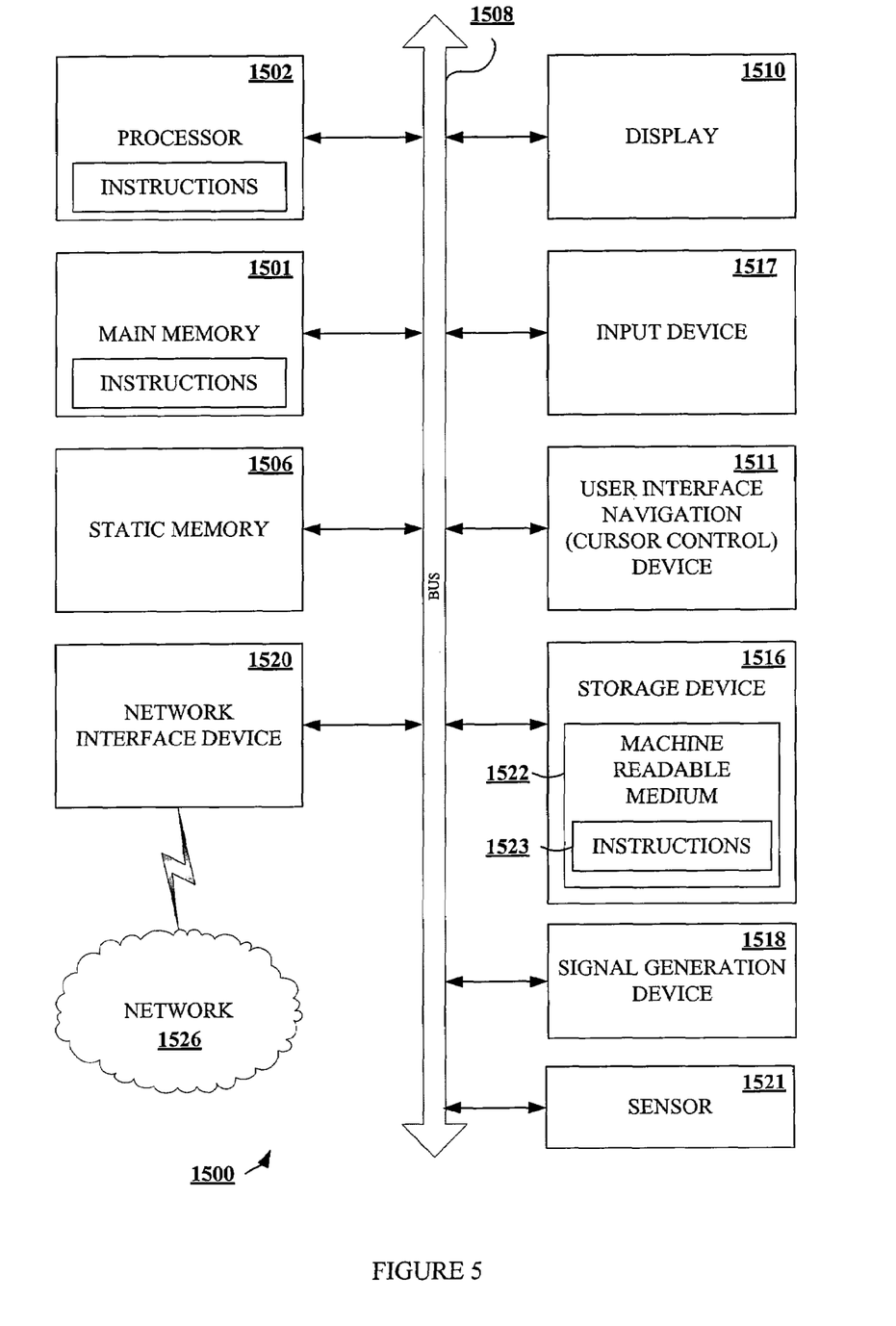
FIG. 5 is a block diagram of a machine in the form of a computer within which a set of instructions, for causing the machine to perform any one or more of the methodologies discussed herein, may be executed.

FIG. 5 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   processing a search query to identify item listings satisfying the search query, each item listing presenting an item that has been assigned to at least one category and on which a bid can be placed;
   deriving for each item listing satisfying the search query a demand metric based on the number of bids that have been placed on an item offered via an item listing, the demand metric derived using a half life formula such that a value for a bid contributing to the demand metric is reduced over time, as determined by the half life formula, wherein the half life formula has a configurable parameter representing the number of days until the value of an event contributing to the demand metric is reduced by half and the configurable parameter is configurable on a per item category basis; and
   presenting the item listings satisfying the search query in a search results page ordered at least in part based on the corresponding demand metric for each item listing.

2. The computer-implemented method of claim 1, wherein an event contributing to the demand metric is selected from the group: a search impression, a view, a transaction, and a watch list; and
   the demand metric is derived using a half life formula such that a value for an event contributing to the demand metric is reduced over time, as determined by the half life formula.

3. The computer-implemented method of claim 1, wherein presenting the item listings satisfying the search query in a search results page ordered at least in part based on the corresponding demand metric for each item listing includes generating a list of the item listings satisfying the search query ordered based in part on the demand metric assigned to each item listing such that the item listing assigned the highest demand metric is first in the list and the item listing assigned the lowest demand metric is last in the list.

4. The computer-implemented method of claim 1, wherein the demand metric is used in calculating a ranking score assigned to each item listing satisfying the query, the ranking score used to order the item listings when presenting the item listings in the search results page.

5. A system comprising:
   a hardware-implemented item listing presentation management module configured to i) process a search query to identify item listings satisfying the search query, each item listing presenting an item that has been assigned to at least one item category and on which a bid can be placed, ii) derive for each item listing satisfying the search query a demand metric based on the number of bids that have been placed on an item offered via an item listing, the demand metric derived using a half life formula such that a value for a bid contributing to the demand metric is reduced over time, as determined by the half life formula, wherein the half life formula has a configurable parameter representing the number of days until the value of an event contributing to the demand metric is reduced by half and the configurable parameter is configurable on a per item category basis, and iii) present the item listings satisfying the search query in a search results page ordered at least in part based on the corresponding demand metric for each item listing.

6. The system of claim 5, wherein an event contributing to the demand metric is selected from the group: a search impression, a view, a transaction, and a watch list; and
   the demand metric is derived using a half life formula such that a value for an event contributing to the demand metric is reduced over time, as determined by the half life formula.

7. The system of claim 5, wherein the hardware-implemented item listing presentation management module is further configured to generate a list of the item listings satisfying the search query ordered based in part on the demand metric assigned to each item listing such that the item listing assigned the highest demand metric is first in the list and the item listing assigned the lowest demand metric is last in the list.

8. The system of claim 5, wherein the demand metric is used in calculating a ranking score assigned to each item listing satisfying the query, the ranking score used to order the item listings when presenting the item listings in the search results page.

9. A server comprising:
   a memory storing instructions executable by a processor, the processor configured to execute the instructions causing the server to perform a method comprising:
   processing a search query to identify item listings satisfying the search query, each item listing presenting an item that has been assigned to at least one item category and on which a bid can be placed;
   deriving for each item listing satisfying the search query a demand metric using a half life formula such that a value for an event contributing to the demand metric is reduced over time, as determined by the half life formula, wherein the half life formula has a configurable parameter representing the number of days until the value of an event contributing to the demand metric is reduced by half and the configurable parameter is configurable on a per item category basis; and
   presenting the item listings satisfying the search query in a search results page ordered at least in part based on the corresponding demand metric for each item listing.

10. The server of claim 9, wherein an event contributing to the demand metric is selected from the group: a search impression, a view, a bid, a transaction, and a watch list.

11. The server of claim 9, wherein presenting the item listings satisfying the search query in a search results page ordered at least in part based on the corresponding demand metric for each item listing includes generating a list of the item listings satisfying the search query ordered based in part on the demand metric assigned to each item listing such that the item listing assigned the highest demand metric is first in the list and the item listing assigned the lowest demand metric is last in the list.

12. The server of claim 9, wherein the demand metric is used in calculating a ranking score assigned to each item listing satisfying the query, the ranking score used to order the item listings when presenting the item listings in the search results page.

13. A computer-implemented method comprising:
   processing a search query to identify item listings satisfying the search query, each item listing including information concerning an item being offered for sale at a fixed price or by auction, and each item assigned to at least one item category;
   deriving for an item listing satisfying the search query a demand metric based on a number of user-events of different types associated with the item listing, the demand metric derived using a half life formula such that a value for any particular event contributing to the demand metric is reduced over time, as determined by the half life formula, wherein the half life formula has a configurable parameter representing the number of days until the value of an event contributing to the demand metric is reduced by half and the configurable parameter is configurable on a per item category basis; and presenting the item listings satisfying the search query in a search results page ordered at least in part based on the corresponding demand metric for each item listing.

14. The computer-implemented method of claim 13, wherein each different type of event that contributes to the demand metric has a separate half life formula with a different configurable parameter representing the number of days until the value of an event of the particular type contributing to the demand metric is reduced by half.

* * * * *

UNITED STATES PATENT AND TRADEMARK OFFICE
CERTIFICATE OF CORRECTION

| | | |
|---|---|---|
| PATENT NO. | : 8,370,336 B2 | Page 1 of 1 |
| APPLICATION NO. | : 12/476134 | |
| DATED | : February 5, 2013 | |
| INVENTOR(S) | : Dumon et al. | |

It is certified that error appears in the above-identified patent and that said Letters Patent is hereby corrected as shown below:

In the Specification

Column 5, line 56, delete "40 C" and insert --40-C-- therefor

Column 6, line 16, delete "half," and insert --half--, therefor

Signed and Sealed this
Second Day of December, 2014

Michelle K. Lee
*Deputy Director of the United States Patent and Trademark Office*